United States Patent
Matsugashita

(10) Patent No.: US 10,154,036 B2
(45) Date of Patent: Dec. 11, 2018

(54) AUTHORIZATION DELEGATION SYSTEM, CONTROL METHOD, AUTHORIZATION SERVER, AND STORAGE MEDIUM

(71) Applicant: CANON KABUSHIKI KAISHA, Tokyo (JP)

(72) Inventor: Hayato Matsugashita, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 186 days.

(21) Appl. No.: 15/213,601

(22) Filed: Jul. 19, 2016

(65) Prior Publication Data
US 2017/0026376 A1   Jan. 26, 2017

(30) Foreign Application Priority Data
Jul. 24, 2015   (JP) ................................ 2015-147023

(51) Int. Cl.
H04L 29/06   (2006.01)
H04L 29/08   (2006.01)

(52) U.S. Cl.
CPC ............. *H04L 63/10* (2013.01); *H04L 63/08* (2013.01); *H04L 63/0876* (2013.01); *H04L 63/0892* (2013.01); *H04L 63/16* (2013.01); *H04L 67/02* (2013.01); *H04L 67/20* (2013.01); *H04L 67/42* (2013.01)

(58) Field of Classification Search
None
See application file for complete search history.

(56) References Cited

U.S. PATENT DOCUMENTS

| | | | |
|---|---|---|---|
| 9,306,923 B2 | 4/2016 | Matsugashita | |
| 2012/0011575 A1* | 1/2012 | Cheswick | G01S 19/14 726/5 |
| 2013/0336312 A1* | 12/2013 | Kimura | H04L 29/06176 370/352 |
| 2014/0063179 A1* | 3/2014 | Kawano | H04L 65/403 348/14.08 |
| 2014/0090028 A1* | 3/2014 | Matsugashita | H04L 63/08 726/4 |
| 2014/0189797 A1* | 7/2014 | Nori | H04L 63/0807 726/4 |
| 2014/0189808 A1* | 7/2014 | Mahaffey | H04L 63/083 726/4 |

FOREIGN PATENT DOCUMENTS

JP   2014-067379 A   4/2014

* cited by examiner

*Primary Examiner* — Malcolm Cribbs
*Assistant Examiner* — Andrew J Steinle
(74) *Attorney, Agent, or Firm* — Cowan, Liebowitz & Latman, P.C.

(57) ABSTRACT

An authorization delegation system includes a resource server that provides a service and an authorization server that performs authorization delegation for authorizing a cooperation server, which is a client apparatus, access to user data that the resource server has based on authorization information. The authorization server receives an authorization delegation request for requesting the authorization delegation, and retrieves a refresh token based on the received authorization delegation request. Additionally, the authorization server determines whether or not the retrieved refresh token is valid, and if it is determined that the refresh token is valid, invalidates the refresh token.

11 Claims, 12 Drawing Sheets

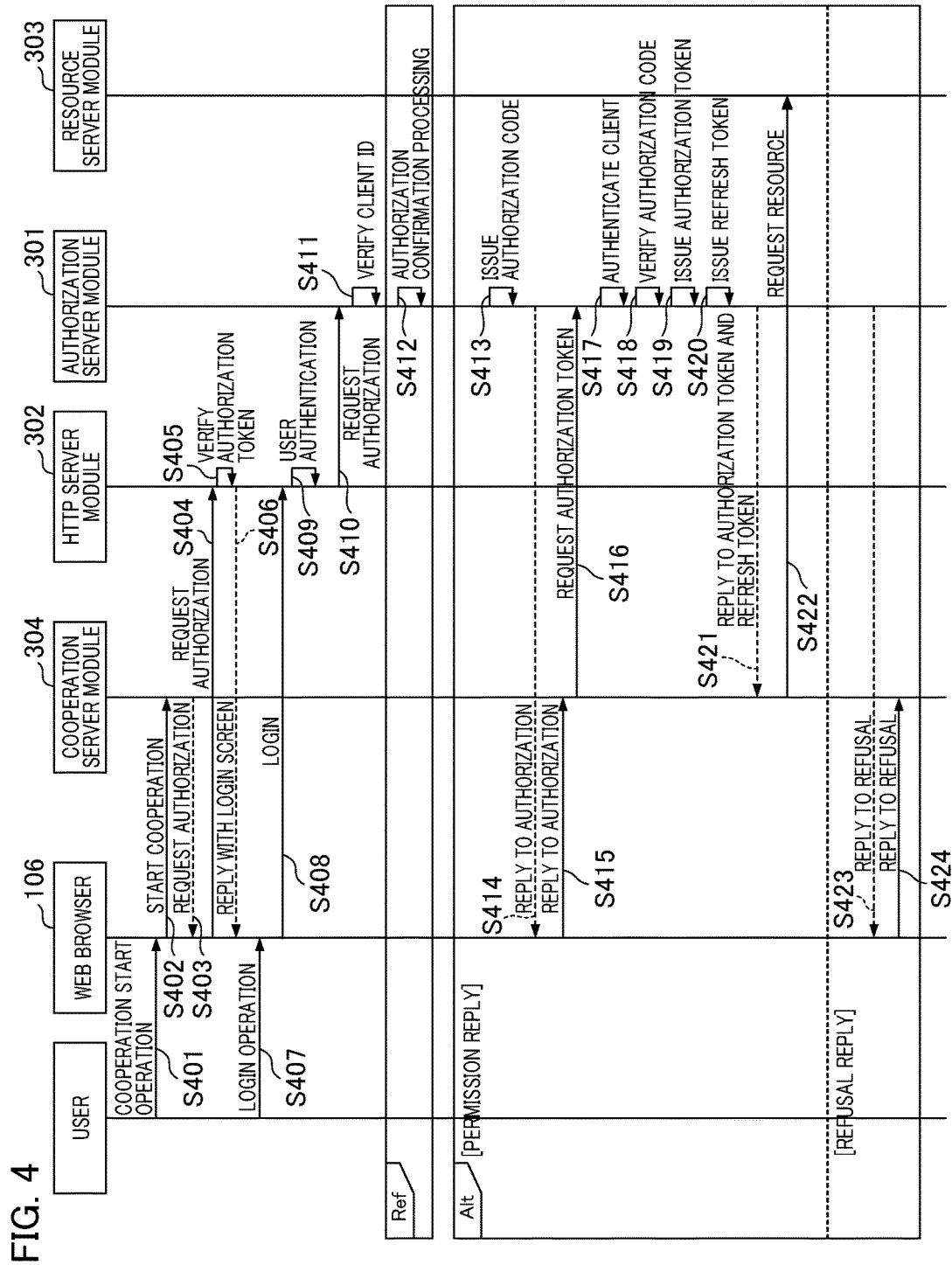

AUTHORIZATION DELEGATION SYSTEM, CONTROL METHOD, AUTHORIZATION SERVER, AND STORAGE MEDIUM

BACKGROUND OF THE INVENTION

Field of the Invention

The present invention relates to an authorization delegation system, a control method, an authorization server, and a storage system.

Description of the Related Art

In recent years, the use of a service developed on the internet referred to as a "cloud service" is expanding. For example, managing a customer relationship by using a CRM (Customer Relationship Management) service is expanding in the business field. Furthermore, performing information transmission or information gathering by using SNS (Social Networking Service) is expanding not only in private but also in the business field.

In addition, a number of these cloud services individually publishes an API (Application Programming Interface) for a Web service. Accordingly, it becomes possible to use a function provided by a service via API from other applications or cloud services. And therefore, functions referred to as mash-ups, which combine the APIs published from a plurality of cloud services and configures it if it were a one web service, are spreading. When viewed from a service provider, preferably the mechanism for cooperating between the cloud services is should be easy to implement.

In contrast, due to an increase in use opportunities of mash-up functions cooperating with a plurality of cloud services, more information than the user desired is exchanged between the plurality of cloud services, and the risk of the leakage of user data or personal information is increasing. Originally, in the respective cloud service, it is not preferable to acquire the user data, personal information, or the like more than necessary. Further, the risk that the user data or personal information will be provided to a cloud service with which the user does not desire to cooperate increases.

In such circumstances, a protocol referred to as OAuth 2.0 for realizing cooperation of authorization is being developed. A description of OAuth 2.0 is given below. In Japanese Patent Laid-Open No. 2014-067379, a technology using OAuth 2.0 is disclosed.

SUMMARY OF THE INVENTION

According to an aspect of the present invention, an authorization delegation system that comprises a resource server that provides a service and an authorization server that performs authorization delegation for authorizing a client apparatus access to user data, which the resource server has, based on authorization information is provided, the authorization delegation system comprises: a receiving unit configured to receive an authorization delegation request for requesting the authorization delegation; a retrieving unit configured to retrieve updating authorization information based on the authorization delegation request; a determining unit configured to determine whether or not the updating authorization information retrieved by the retrieving unit is valid; an invalidating unit configured to invalidate the retrieved updating authorization information if the determining unit determines that the authorization information is valid.

Further features of the present invention will become apparent from the following description of exemplary embodiments with reference to the attached drawings.

BRIEF DESCRIPTION OF THE DRAWINGS

FIG. 4 illustrates a sequence of authorization using OAuth 2.0.

DESCRIPTION OF THE EMBODIMENTS

Figure 1:
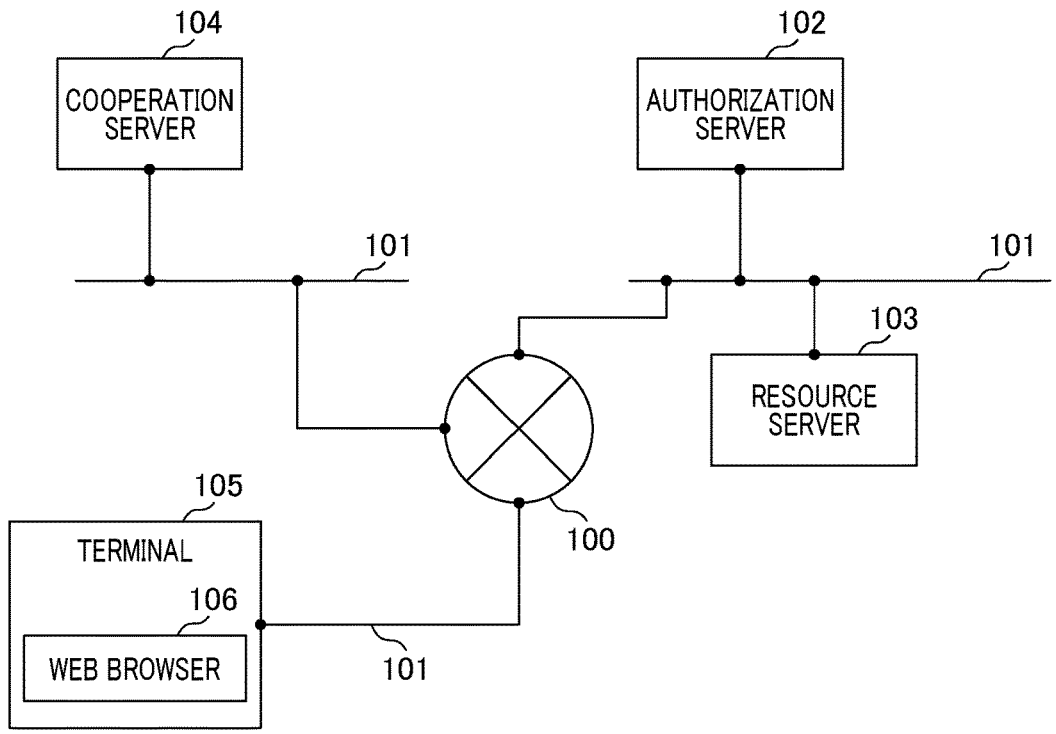
FIG. 1 illustrates a system configuration.

There is a danger in terms of security in a current configuration that in OAuth 2.0, after the period of validity of an authorization token has passed, a refresh is performed without an authorization operation by a user. For example, if a client ID, secret, and refresh token are leaked, an authorization token will be acquired without an authorization operation, and thereby a user's resource will be acquired by a malicious client. In addition, in order to cope with the leakage of the client's client ID, secret, and refresh token, changing the client ID or the secret managed inside the client will hugely affect the client's implementation or operation.

The present invention provides an authorization delegation system that has improved the safety without changing a client ID or secret and by disabling the leaked refresh token.

Firstly, a description will be given of OAuth 2.0. According to OAuth 2.0, a service B can access an API that holds data of a user, which is managed by a certain service A, if the service B is authorized by the user. At this time, upon disclosing the scope that will be accessed from the service B, the service A gets explicit authorization from the user for access to the API by the service B. The user performing explicit authorization is referred to as an "authorization operation".

If the user performs the authorization operation, the service B receives a token that certifies that the service A has authorized the access (hereinafter referred to as an "authorization token") and can realize access to the API of the service A thereafter by using the authorization token (authentication information). The action of authorizing the service B to access the resource of the user by the user's authorization operation is referred to as a "delegating authorization".

Here, by using the authorization token, the service B can access the API of the service A with the authorization of the user that has authorized without the authentication information of the user. Accordingly, the service B that has been authorized by the user and that has acquired the authorization token is responsible for managing the authorization token strictly and properly. In addition, the period of validity is set to the authorization token and if it is within the period of validity, the API can be used.

In OAuth 2.0, in order to prevent spoofing of the service B, it is necessary to authenticate the service B. In order to authenticate the service B, the service A needs to issue and manage authentication information, more specifically, a client ID and a secret, and furthermore, needs to set the authentication information in the service B in advance. Hereinafter, the service B viewed from the service A is referred to as a "client".

Furthermore, in OAuth 2.0, an authorization server which performs the authorization operation of the user, issues the authorization token, and authenticates the client and a resource server that manages the data of the user as a resource and publishes the API as a web service can be separately configured. In this case, the client receives the authorization delegation, acquires the authorization token from the authorization server, and uses the API of the resource server by using the authorization token. The resource server is configured to request a verification of the acquired authorization token to the authorize server, and to permit, as a result, only if permission is obtained, access to the resource and to reply data to the client. As a verification by the authorized server, for example, the aforementioned authorization token is verified as to whether it is within the period of validity.

As described above, in OAuth 2.0, based on the authorization operation by the user, the authorization token is issued, and by using the authorization token, if the authorization token is within the period of validity thereof, it becomes possible to use an API of other services. In other words, if the period of validity thereof has elapsed and the authorization token becomes invalid, the API cannot be used without issuing the authorization token again. However, in order to reissue the authorization token, requesting the user of the authorization operation every time is complicated and lacks convenience.

Therefore, in OAuth 2.0, a protocol for refreshing, which is reissuing the authorization token without the authorization operation by the user, has been developed. In refreshing, a refresh token (updated authorization information) is used for refreshing the authorization token. This refresh token is usually valid for a longer period than the authorization token. The client can acquire the authorization token with a new period of validity without the authorization operation by the user, by transmitting the aforementioned client ID, secret, and the refresh token to the authorization server.

In OAuth 2.0, two methods for issuing and managing the refresh token are defined and can be selected. In the first method, the refresh token, which is acquired together when the authorization token is acquired by using an authorization code acquired as a result of the authorization operation, is fixed. Subsequently, even if the refresh flow is executed many times, the refresh token will not be changed. In other words, the first method is one in which the target to be refreshed is only the authorization token. In the second method, the refresh token is dynamic. A new refresh token is issued every time that the refresh flow is executed, and the old refresh token becomes invalid. In other words, the second method is one in which not only the authorization token, but the refresh token is also updated. When considering a replay attack, the second method which also refreshes the refresh token may be considered to be more secure.

In an authorization delegation system of each embodiment according to the present invention, the second method is more useful as a management method, and therefore, a description will be given of the second method. However, it is not limited to the second method and the present invention can be implemented in the first method.

In the beginning, a description will be given of a definition of terms used in each embodiment according to the present invention.

A "service" means a function provided to a client by executing software, which runs on a server, in accordance with a request from the client. Note that a web application that is the server may be also called as a "service". In the preset embodiment, there are two services to be provided. One is a service provided by a cooperation server as a cloud service, and another is a service provided by a resource server. In the description, it is assumed that a user uses the service provided by the cooperation server via a terminal. In addition, in the description, it is assumed that the resource server publishes an API as a web service and the cooperation server provides a mash-up function to the user by using this API. In other words, the cooperation server is a client when viewed from the resource server.

Naturally, this is contemplated for describing the present embodiment and it is not limiting to the configuration in which the cooperation server, resource server, and the terminal are respectively configured as a simple body. For example, a server group comprising multiple servers may provide the service. Accordingly, when it is referred to as a "server system" in the present invention, it indicates that the system comprises one or more servers.

Note that, in order to use the API of the resource server, the cooperation server needs authorization delegation accompanied with the user's authorization operation by Authorization Code Grant of the OAuth 2.0 as described below. In other words, the cooperation server that has received the authorization delegation from the user becomes able to use the API of the resource server.

First Embodiment

An authorization delegation system according to the present embodiment is realized on the network configuration shown in FIG. 1.

A WAN 100 is a Wide Area Network and in the present invention, World Wide Web (WWW) system is configured. A LAN 101 is a Local Area Network that connects each component. An authorization server 102 is an authorization server that realizes OAuth 2.0 and an authorization server module is installed. A resource server 103 is a resource server and a resource server module that includes an API, which is published as a web service, is installed. A cooperation server 104 is a cooperation server in which a cooperation server module is installed. The cooperation server module provides a mash-up function together with a service provided by the cooperation server module itself to the user by using the API published by the resource server module, which is included in the resource server 103.

A terminal 105 is a terminal in which a web browser 106 is installed. For example, the terminal 105 is a mobile terminal or the like that is referred to as a "PC" or "smartphone". A user uses the web browser 106 to communicate with the cooperation server 104 and the authorization server 102. In addition, the authorization server 102 and the resource server 103 are connected via the LAN 101. Further, the authorization server 102, the resource server 103, the cooperation server 104, and the terminal 105 are communicably connected with each other via the WAN 100. Additionally, the authorization server 102 may be configured to be connected to a database (not shown) via the LAN 102 and to store data in the database, which the authorization server module uses. Further, the resource server 103 and the authorization server 102 may be configured on a same server. And the cooperation server 104 need not be an independent server, but may be configured as an application. For example, the resource server 103 or the authorization server 102 may be configured as a PaaS (Platform as a Service) and the cooperation server 104 may be configured as an application service which operates on that platform.

Figure 2:
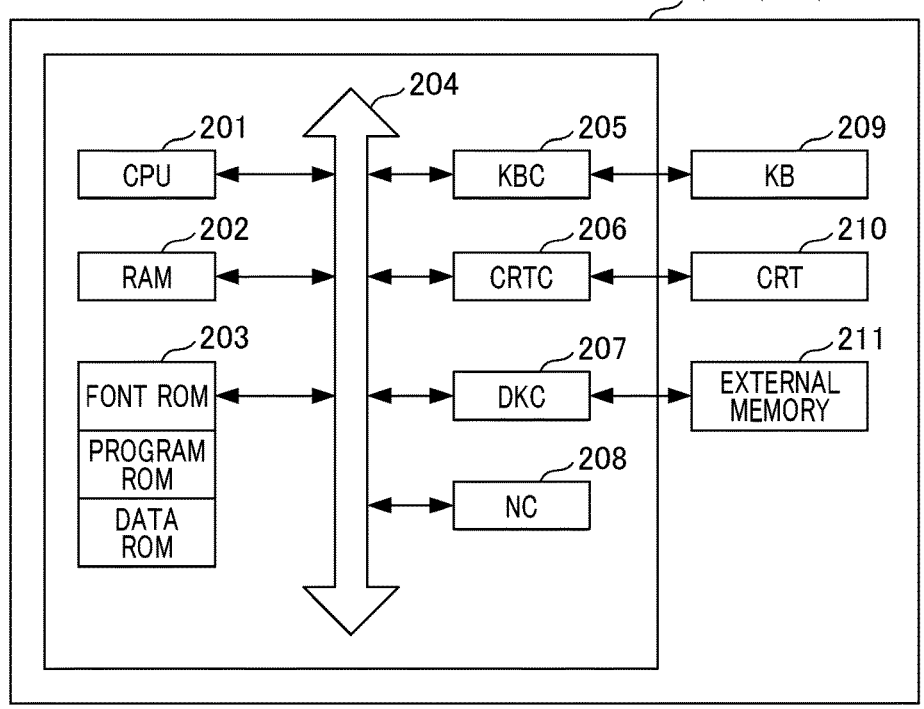
FIG. 2 illustrates hardware configuration of each apparatus.

The authorization delegation system according to the preset embodiment is realized on a system comprising a server and a terminal of configurations shown in FIG. 2.

FIG. 2 illustrates a hardware configuration of the authorization server 102, the resource server 103, the cooperation server 104, and the terminal 105. Note that a hardware block diagram shown in FIG. 2 is a hard ware block diagram of a common information processing apparatus. A hardware configuration of a common information processing apparatus or a virtual hardware configuration of an information processing apparatus provided as IaaS (Infrastructure as a Service) may be applied to each server and a terminal according to the present embodiment.

A CPU 201 executes programs of OS or an application or the like, which is loaded to a RAM 202 from a program ROM of a ROM 203 or an external memory such as a hard disk (HD) or the like, and controls each block connected to a system bus 204. Here, "OS" is an abbreviation for "operating system" that operates on a computer, and hereinafter operating system is referred to as an "OS". Processing in each sequence described below can be realized by executing the program. The RAM 202 is a main memory of the CPU 201 and functions as a work area or the like. A keyboard controller (KBC) 205 controls a key input from a keyboard 209 or a pointing device (not shown). A CRT controller (CRTC) 206 controls a display on a CRT display 210. A disk controller (DKC) 207 controls data access to an external memory 211 such as hard disk (HD) which stores various data. A network controller (NC) 208 executes communication control processing with other devices connected via the WAN 100 or LAN 101.

In a case of a virtual information processing apparatus provided as IaaS, the KBC 205, the CRT 206, or the like is not included, and the information processing apparatus is configured to be operated from a keyboard 209 or a CRT display 210, which is included in a terminal connected via the NC 208.

Note that, in all of the description below, unless otherwise noticed, the entity on hardware of execution in the server or terminal is the CPU 201, and the entity on software is an application program installed in the external memory 211.

Figure 3A:
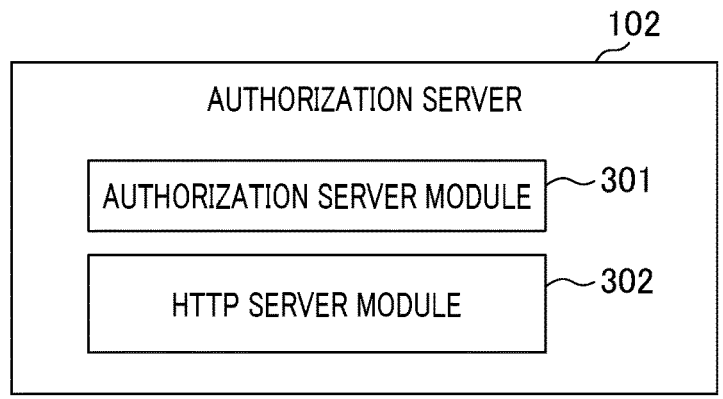
FIGS. 3A to 3C illustrate software module configurations of each apparatus.
Figure 3B:
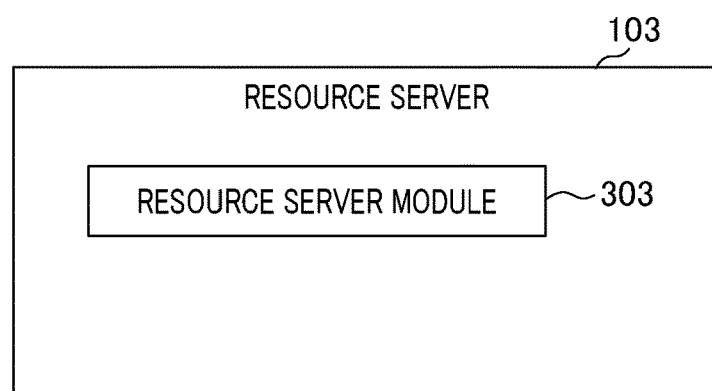
Figure 3C:
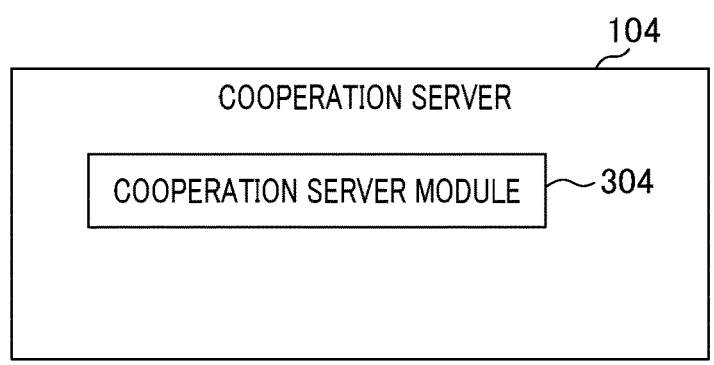

FIGS. 3A to 3C each illustrates a module configuration of the authorization server 102, the resource server 103, and the cooperation server 104 according to the preset invention and the authorization server 102, the resource server 103, and the cooperation server 104 provide services by each of them executing the modules. Note that the authorization server 102, the resource server 103 and the cooperation server 104 are the same as those shown in FIG. 2.

The authorization server 102 includes an authorization server module 301 and a HTTP server module 302. The HTTP server module 302 is module for performing HTTP communication with the web browser 106 installed in the terminal 105, which is connected to the authorization server via the WAN 100. In addition, the HTTP server module is configured to be able to communicate by SSL/TLS and includes a certificate store (not shown). Further, in the present embodiment, if an authorization request is received, it is configured to request the request source for a user authentication using a user ID and a password.

Next, the authorization server module 301 is a web application that operates on the HTTP server module or operates by cooperating with the HTTP server module 302 and receives a request from the web browser 106 via the HTT server module 302, and processes and replies to the request. At this time, in the present embodiment, it is configured to receive the user authentication by the HTTP server module 302 and if the authentication of the request source has succeeded, an authentication token, which is associated with user information that has been authenticated, is generated and the authentication token is reported to the authorization server module 301.

Here, the authentication token is a token that indicates that the user has been authenticated and is logging in, or is a token for verifying whether the user is authenticated. Using this authentication token enables identifying the user. An authorization token which is described below is a token that indicates the authenticated user has also permitted the client, which is the target that has performed the authorization operation, to access on behalf of the user with user authority. Accordingly the authentication token and the authorization token are different. In particular, the authentication token has the purpose of confirming the user, but the authorization token has the purpose of confirming the authority.

In addition, the authorization token is acquired by using the authorization code and indicates that the client has authority to use the API. Further, a refresh token is also acquired by using the authorization code and indicates that the authorization code can be reissued. The details of the HTTP server module 302 and the authorization server module 301 will be described below.

The authorization server module 301 is configured to receive verification processing of the authorization token from the resource server module 303 via the LAN 101, and to process and reply to the verification processing. The verification processing of the authorization token can be configured as RPC (Remote Procedure Call) or can be configured as an API of a web service communicable within the LAN 101 via the HTTP server module 302.

The resource server 103 includes a resource server module 303. The resource server module 303 may be configured to operate on a HTTP server module (not shown). The resource server module 303 includes an API that is published as a web service and receives a resource request described below from the cooperation server 104, and processes and replies to the request. In addition, the resource server module 303 requests verification processing of the authorization token described below to the authorization server module 301 via the LAN 101.

The cooperation server 104 includes a cooperation server module 304. The cooperation server module 304 may be configured to operate on a HTTP server module (not shown). The cooperation server module 304 is a web application and receives a request from the web browser 106, and processes and replies to the request. In addition, the cooperation server module 304 is configured as a HTTP client that calls the API of the web service published by the resource server module 303.

A description will be given of a sequence until the cooperation server module 304 uses the API that the resource server module 303 publishes, using Authorization Code Grant of OAuth 2.0, according to the present invention with reference to FIG. 4, FIG. 5 and each of the tables.

Note that "Ref" shown in the FIG. 4 indicates a reference, and it is described in another figure. In addition, "Alt" indicates a branch and indicates a branch processing according to the result of a sequence in advance.

Firstly, an example of data of a user table of the authorization server module is shown in table 1 and an example of a client table of the authorization server module is shown in table 2.

TABLE 1

USER TABLE OF AUTHORIZATION SERVER MODULE

| | USER ID | UUID | PASSWORD | AUTHORITY INFORMATION |
|---|---|---|---|---|
| ROW1 | admin@xx.com | 10000000 | admin | ADMINISTRATOR |
| ROW2 | user@xx.com | 10000001 | user | GENERAL |

TABLE 2

CLIENT TABLE OF AUTHORIZATION SERVER MODULE

| | CLIENT ID | SECRET | CLIENT NAME | REDIRECT URI |
|---|---|---|---|---|
| ROW1 | c001@xx.com | xxxxxxxxxx | COOPERATION SERVICE | https://xx/res |
| ROW2 | c002@zz.com | xxxxxxxxxx | COOPERATION SERVICE 2 | https://xx/res |

The user described in the sequence of the present embodiment is assumed to use a user ID "user@xx.com" and a password thereof.

In addition, the cooperation server module 304 described in the sequence holds a client ID "c001@xx.com" and a secret, redirect URI, which are various data of the client. The redirect URI is a URI for the cooperation server module 304 to receive an authorization reply. These data are required to be registered in the authorization server module 301 in advance, but as a registering method, a method using a screen (not shown) or a unit to implement by an API published by the authorization server module 301.

In S401, the user executes a cooperation start operation (not shown) displayed in the web browser 106. In S402, cooperation start is reported to the cooperation server module 304 from the web browser 106. The cooperation server module 304 that has received the cooperation start performs authorization request (authorization delegate request) to the authorization server module 301 via the web browser 106 and the HTTP server module 302 in S403 or S410.

Here, the processing of issuing the authorization token, which is a process from the authorization request in S403 to reply of the authorization token and the refresh token in S421, is implemented according to the Authorization Code Grant flow defined in OAuth 2.0.

In the authorization request, at least the aforementioned client ID "c001@xx.com" and redirect URI "https://xx/res" held in the cooperation server module 304 are included. Furthermore, a scope "profile" which indicates the scope of the resource that is authorization delegated from the user to the cooperation server module 304 is included. Note that the redirect URI is a URL of the client that receives the authorization code issued by the authorization server 102 as described above.

In S404, the HTTP server module 302 receives the authorization request from the web browser 106.

In S405, the HTTP server module 302 verifies whether a valid authentication token is included as a HTTP Cookie in the authorization request from the web browser 106.

If it is included, the HTTP server module 302 notifies the authorization server module 301 about the authentication token and shifts to S410.

If it is not included, the following process is executed. In S406, the HTTP server module 302 replies a login screen to perform user authentication to the web browser 106.

Figure 5:
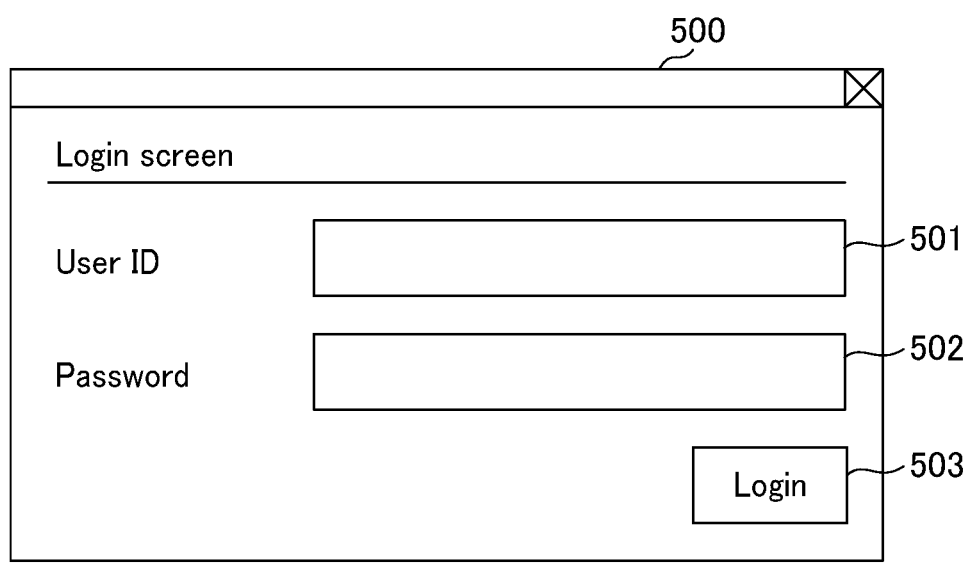
FIG. 5 illustrates an example of a login screen.

Here, FIG. 5 is an example of the login screen to which the HTTP server module 302 replies.

In the present embodiment, the user inputs a user ID and a password, and if the combination thereof matches with the combination of information registered in the user table of the authorization server module 301, authentication is performed. Note that as a method to authenticate the user, other methods, for example, a certificate of X.509 or multi-step authentication that requires a plurality of input of passwords or the like, may be configured and it is not limited to this method.

The login screen 500 shown in FIG. 5 comprises a user ID input field 501 to input the user ID, a password input field 502 to input the password, and a login button 503 for executing login operation. In S407, the user inputs necessary information in the login screen 500 displayed on the web browser 106 and presses the login button 503.

In S408, the web browser 106 transmits the inputted information to the HTTP server module 302.

In S409, the HTTP server module 302 acquires the user ID and the password, compares with the combination of the information of the user ID and the password in the user table, and verifies whether they match to thereby authenticate the user.

In the present embodiment, the user ID "user@xx.com" and the password "user" are input in the login screen 500, and the HTTP server module 302 verifies those data and performs authentication. Note that if the user authentication fails, in other words, if the information is not registered in the user table, the HTTP server module 302 replies to the web browser with an authentication error screen (not shown).

If the user authentication has succeeded, the HTTP server module 302 generates the authentication token. This authentication token is stored in the non-volatile memory of the HTTP server module 302 in association with a UUID that corresponds to the user ID. The UUID is a Universal Unique Identifier and is a unique ID that is not duplicated. In the preset embodiment, the UUID "10000001" corresponding to the user ID "user@xx.com" is stored in association.

In S410, the HTTP server module 302 performs a request including the authentication token to the authorization server module 301. Note that the authentication token is set as an HTTP Cookie and is set in the reply to the web browser 106 from the HTTP server module 302 and is reported.

Hereinafter, the access from the web browser 106 to the authorization server module 301 is executing verification of the authentication token, authentication processing, and notification of the authentication token to the authorization server module 301, and the description will be omitted.

In S411, the authorization server module 301 verifies whether the combination of the client ID and the redirect ULR is correct from among the received authorization request. More specifically, it is verified whether the combination of the client ID and the redirect URL registered in the client table matches. If they are not matched, the authorization server module 301 replies to the web browser 106 with the error screen (not shown) via the HTTP server module 302.

If they are matched, the authorization server module 301 implements authorization confirmation processing in S412. The authorization confirmation processing is described below with reference to FIG. 7.

Next, a description will be given of a case that a result of the authorization confirmation processing is "permission reply" in the authorization server module 301.

In S413, the authorization server module 301 issues the authorization code. More specifically, a token ID "cd_000001" is issued. Then the authorization server module 301 registers the client ID "c001@xx.com", the redirect URI "https://xx/res", the scope "profile", and the UUID "10000001" that corresponds to the user ID of the user, which has authenticated and received permission, included in the authorization request. At this time, a category of the token is authorization code, and a time and date of the period during which the authorization code is valid is registered as a period of validity. Note that in the example of the token table shown in table 3, the state indicating whether or not the token is invalid is registered as "valid", but it may be configured to confirm the validity every time by verifying the period of validity.

Table 3 illustrates an example of the token table of the authorization server module. In table 3, a state is shown in which the refresh token of the token ID "rt_000000" has been issued already, but the description of the use of the refresh token is given in the authorization confirmation processing.

TABLE 3

TOKEN TABLE OF AUTHORIZATION SERVER MODULE

| | TOKEN ID | CATEGORY | CLIENT ID | UUID |
|---|---|---|---|---|
| ROW 1 | rt_000000 | REFRESH TOKEN | c001@xx.com | 10000001 |
| ROW 2 | cd_000001 | AUTHORIZATION CODE | c001@xx.com | 10000001 |

| | SCOPE | REDIRECT URI | STATE | PERIOD OF VALIDITY |
|---|---|---|---|---|
| ROW 1 | profile | | VALID | Jan. 1, 2015 0:00 |
| ROW 2 | profile | https://xx/res | VALID | Apr. 1, 2014 0:00 |

In S414 and S415, the authorization server module 301 gives the token ID "cd_000001" of the issued authorization code and replies to the cooperation server module 304 with the authorization via the web browser 106. More specifically, a redirect reply is performed on the web browser 106 so that the web browser 106 is redirected to the redirect URI "http://xx/res" acquired at the time of authorization request.

In S416, the cooperation server module 304 requests the authorization token to the authorization server module 301. In this authorization token request, at least the acquired authorization code "cd_000001", client ID "c001@xx.com", secret "xxxxxxxxxx", and redirect URI "https://xx/res" that is transmitted at the time of authorization request are included.

In S417, the authorization server module 301 authenticates the client by the combination of the acquired client ID "c001@xx.com" and secret "xxxxxxxxxx". More specifically, the authentication is performed by verifying whether the acquired combination matches the combination in the client table. Here, if the client authentication fails, the authorization server module 301 replies to the cooperation server module 304 with an error.

If the client authentication succeeds, in S418, the authorization server module 301 verifies the acquired authorization code "cd_000001". As the verification of the authorization code, it is verified whether the acquired authorization code is registered in the token table, and if it is registered, it is verified whether the authorization code is valid. Further, it is verified that the client ID "c001@xx.com" and redirect URI "https://xx/res", which are acquired in the authorization token request, match the client ID and redirect URI in the token table. If the result of the verification of the authorization code is invalid, the authorization server module 301 replies a to the cooperation server module 304 with a token fraud error.

If the result of the verification of the authorization code is valid, the authorization server module 301 issues an authorization token in S419. More specifically, a token ID "at_000001" is issued and the user ID "10000001" associated with the authorization code, scope "profile", and authenticated client ID "c001@xx.com" are registered in the token table. At this time, the token category would be an authorization token, and the time and date of the period that the authorization token is valid is registered as the period of validity.

Further, in S420, the authorization server module 301 issues a refresh token. More specifically, a token ID "rt_000001" is issued. And the UUID "10000001" of the user associated with the authorization token "at_000001", scope "profile", and authenticated client ID "c001@xx.com" are registered in the token table.

At this time, the token category would be a refresh token, and the time and date of the period that the refresh token is valid is registered as the period of validity. In addition, in OAuth 2.0, the authorization code is recommended to be controlled so as to be used only once. Accordingly, the state of the authorization code of the token ID "cd_000001" is set as "invalid". Note that as a process to set "invalid", not only using the state but methods such as updating the period of validity to a date and time in the past so that it can be treated as invalid, or deleting the record itself from the table to be invalid may be used.

In table 4, an example of a token table of the authorization server module is illustrated. Here, the state of the refresh token of the token ID "rt_000000" is "invalid", but a description of updating processing will be given below.

TABLE 4

TOKEN TABLE OF AUTHORIZATION SERVER MODULE

| | TOKEN ID | CATEGORY | CLIENT ID | UUID |
|---|---|---|---|---|
| ROW 1 | rt_000000 | REFRESH TOKEN | c001@xx.com | 10000001 |
| ROW 2 | cd_000001 | AUTHORIZATION CODE | c001@xx.com | 10000001 |
| ROW 3 | at_000001 | AUTHORIZATION TOKEN | c001@xx.com | 10000001 |
| ROW 4 | rt_000001 | REFRESH TOKEN | c001@xx.com | 10000001 |

| | SCOPE | REDIRECT URI | STATE | PERIOD OF VALIDITY |
|---|---|---|---|---|
| ROW 1 | profile | | INVALID | Jan. 1, 2015 0:00 |
| ROW 2 | profile | https://xx/res | INVALID | Jan. 1, 1970 0:00 |
| ROW 3 | profile | | VALID | Apr. 1, 2014 0:00 |
| ROW 4 | Frofile | | VALID | Jan. 1, 2015 0:00 |

In S421, the authorization server module 301 replies to the cooperation server module 304 with the issued token ID of the authorization token, which is "at_000001", and the issued token ID of the refresh token, which is "rt_000001".

The cooperation server module 304 that has acquired the authorization token performs a resource request on the API published by the resource server module 303 in S422.

Next, a description will be given of a sequence if, in the authorization server module 301, the result of the authorization confirmation processing is [refusal reply].

In S423 and S424, the authorization server module 301 replies to the cooperation server module 304 with a refusal reply via the web browser 106. More, specifically, redirect reply is performed on the web browser 106 so that the web browser 106 is redirected to the redirect URI "http://xx/res" acquired at the time of authorization request.

The above-described description is the sequence of the present embodiment using Authorization Code Grant of OAuth 2.0, until the cooperation server module 304 uses the API published by the resource server module 303.

Next, a description will be given of a refresh sequence of OAuth 2.0 for which the cooperation server module 304 refreshes the authorization token and uses the API published by the resource server module 303, according to the present invention with reference to FIG. 6.

Figure 6:
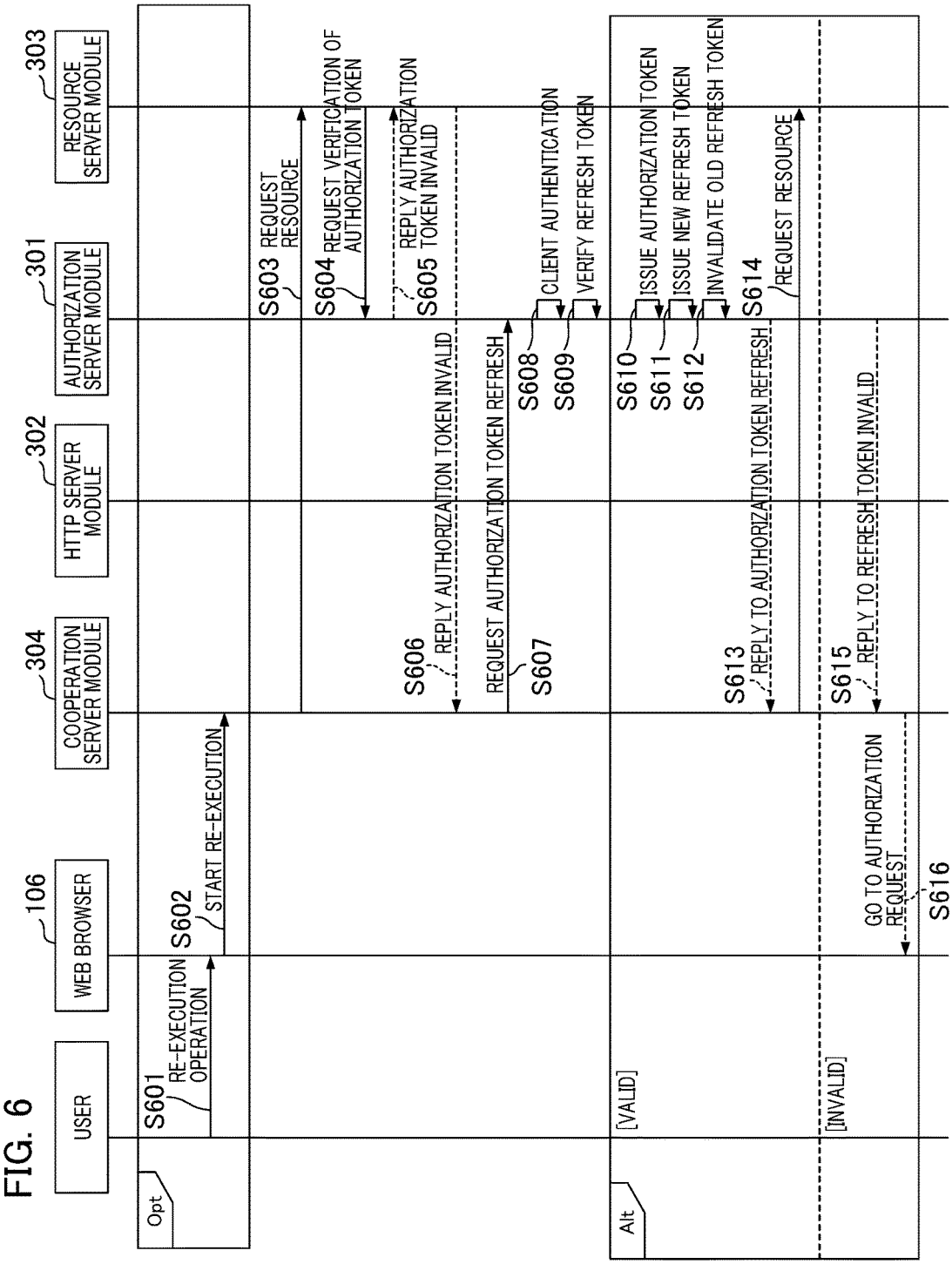
FIG. 6 illustrates a refresh sequence using OAuth 2.0.

Note that "Alt" shown in the FIG. 6 indicates a branch, and indicates a branch processing according to the result of a sequence in advance. In addition, "Opt" indicates an option, and indicates that the processing may be omitted.

There are cases in which the sequence begins by a user operation of S601 and the sequence occurs in the processing of the cooperation server module 304 itself. Therefore, S601 and S602 are described as an option.

In S601, the user performs a re-execution operation (not shown) displayed on the Web browser.

In S602, re-execution is reported to the cooperation server module 304 from the web browser 106. The cooperation server module 304, which has received the re-execution, performs the resource request to the API published by the resource server module 303, by using the already acquired authorization token "at_000001", in S603. Here, a description will be given of a case that the authorization token "at_000001" has reached the period of validity and is in invalid state.

In S605, the resource server module 303 performs a verification request of the authorization token for inquiring whether or not the authorization token "at_000001" is valid to the authorization server module 301. The authorization server module 301 refers to the token table and confirms whether the authorization token "at_000001" is valid and replies with the result. As described above, the authorization token is invalid, and thereby the authorization server module 301 transmits an reply of invalid for the authorization token to the resource server module 303.

In S606, the resource server module 303 returns an reply of invalid for the authorization token to the cooperation server module 304 as the authorization token "at_000001" is invalid.

In S607, the cooperation server module 304 performs a refresh request for the authorization token to the authorization server module 301. At this time, the authorization token, token ID "rt_000001", which is acquired in the reply of the refresh token, and client ID "c001@xx.com", and secret "xxxxxxxxxx" are transmitted.

In S608, the authorization server module 301 authenticates the client by using the combination of the acquired client ID "c001@xx.com" and the acquired secret "xxxxxxxxxx". More specifically, it is authenticated by verifying whether the acquired combination matches the combination in the client table.

If the client authentication has failed, the cooperation server module replies with an authentication error.

If the client authentication has succeeded, in S609, the authorization server module 301 verifies the acquired refresh token "rt_000001". As the verification of the authorization code, it is verified whether the acquired refresh token is registered in the token table, and if it is registered, whether the refresh token is valid. Further, it is verified that the client ID "c001@xx.com" which is acquired in the refresh request of the authorization token matches the client ID in the token table. A description will be given below in a case that the result of the verification of the refresh token is [invalid].

If the result of the verification of the refresh token is [valid], the authorization server module 301 issues an authorization token in S610. More specifically, the authorization server module 301 issues a token ID "at_000002" and registers UUID "10000001" of the user associated with the refresh token, scope "profile", and the authenticated client ID "c001@xx.com" to the token table. At this time, the token category would be an authorization token, and the time and date of the period that the authorization token is valid is registered as the period of validity.

Further, the authorization server module 301 issues a refresh token in S611. More specifically, a token ID "rt_000002" is issued. And the UUID "10000001" of the user associated with the authorization token "at_000002", scope "profile", and authenticated client ID "c001@xx.com" are registered in the token table. At this time, the token category would be a refresh token, and the time and date of the period that the refresh token is valid is registered as the period of validity.

In addition, in a method of OAuth 2.0, the refresh token is controlled so as to be used only once. Accordingly, in S612, the state of the refresh token of the token ID "rt_000001" is set as "invalid". Note that as a process to set "invalid", not only using the state but methods such as updating the period of validity to a date and time in the past so that it can be treated as invalid, or deleting the record itself from the table so as to be invalid may be used.

In table 5, an example of a token table of the authorization server module is illustrated.

TABLE 5

TOKEN TABLE OF AUTHORIZATION SERVER MODULE

| | TOKEN ID | CATEGORY | CLIENT ID | UUID |
|---|---|---|---|---|
| ROW 1 | rt_000000 | REFRESH TOKEN | c001@xx.com | 10000001 |
| ROW 2 | cd_000001 | AUTHORIZATION CODE | c001@xx.com | 10000001 |
| ROW 3 | at_000001 | AUTHORIZATION TOKEN | c001@xx.com | 10000001 |
| ROW 4 | rt_000001 | REFRESH TOKEN | c001@xx.com | 10000001 |
| ROW 5 | at_000002 | AUTHORIZATION TOKEN | c001@xx.com | 10000001 |
| ROW 6 | rt_000002 | REFRESH TOKEN | c001@xx.com | 10000001 |

| | SCOPE | REDIRECT URI | STATE | PERIOD OF VALIDITY |
|---|---|---|---|---|
| ROW 1 | profile | | INVALID | Jan. 1, 2015 0:00 |
| ROW 2 | profile | https://xx/res | INVALID | Jan. 1, 1970 0:00 |
| ROW 3 | profile | | INVALID | Apr. 1, 2014 0:00 |
| ROW 4 | profile | | INVALID | Jan. 1, 2015 0:00 |
| ROW 5 | profile | | VALID | Apr. 2, 2014 0:00 |
| ROW 6 | profile | | VALID | Jan. 2, 2015 0:00 |

In S613, the authorization server module 301 replies to the cooperation server module 304 with the issued token ID of the authorization token, which is "at_000002", and the issued token ID of the refresh token, which is "rt_000002".

The cooperation server module 304 that has acquired the authorization token performs resource request to the API published by the resource server module 303 in S614.

Next, a description will be given of a sequence if, in the authorization server module 301, the result of the verification of the refresh token is [invalid].

Here, a description will be given of a case that the result of the verification of the refresh token is [invalid]. Firstly, there is a case that the refresh token to be verified has reached the period of validity and is thereby invalid. This case is the case that is usually assumed. In this case, as it is a normal case, only the following sequence should be executed and other processing is not necessary.

Another case is a case that corresponds to the following processing, which is a feature of the present embodiment. This case is one in which the client ID, secret, and token ID of the refresh token have been leaked, and the refresh request of the authorization token has been performed by a third party. In this case, the refresh token that the cooperation server module 304 holds is, as described above, invalid as having been already used. In addition, a state can be assumed that the third party may fraudulently use the API published by the resource server module 303. The response to this case will be described below.

In S615, the authorization server module 301 replies to the cooperation server module 304 that the refresh token is invalid. The cooperation server module 304 that has received the invalid reply of the refresh token performs the authorization request of the aforementioned S403. Subsequent processes are the same as the sequence described with reference to FIG. 4, and therefore the description will be omitted.

The above-described description is the refresh sequence of OAuth 2.0 for the cooperation server module 304 to refresh the authorization token and use the API published by the resource server module 303.

Subsequently, a description will be given of the authorization confirmation processing S412 described with reference to FIG. 4, which is the feature of the present embodiment, with reference to FIG. 7 and FIG. 8. This authorization confirmation processing S412 enables eliminating the aforementioned case which needs to be handled, in other words, enables eliminating the state in which the third party can fraudulently use the API published by the resource server module 303.

Here, in OAuth 2.0, once the user has performed the authorization operation, it may be configured so that the user will not require another authorization operation with the same client, same user, or same scope as the past. The processing for not requiring another identical authorization operation is referred to as skip processing of the authorization confirmation.

In the present embodiment, the description is given with the skip processing of the authorization confirmation included, but the skip processing of the authorization confirmation is optional processing in OAuth 2.0, so that it is possible to configure so that the authorization operation is always required.

In addition, in the authorization request described in FIG. 4, it is possible to be able to specify that an authorization confirmation screen is always replied to.

Note that if the condition to perform this skip processing of the authorization confirmation is only the above condition, the user cannot perform the authorization operation again by the condition once the authorization operation has performed. This may be a disadvantage to the user. For example, even if special processing is added when a refusal of authorization is selected in the refusal operation, or processing for showing additional information in the authorization operation is added, the user who has performed permission in the authorization operation in the past cannot perform the additional processing.

Accordingly, for example, the period of validity is set to a period such that the authorization operation is performed in the same condition, in other words, by the same client, the same user, and the same scope, and when the period has expired, it may be configured so as not to perform the skip processing of the authorization confirmation.

Further, as a feature of the present embodiment, even if the authorization operation has been performed in the past with the same condition, if the refresh token issued by the same condition remains in the valid state, processing not to perform the skip processing of the authorization confirmation is added. The reason for this processing is that in spite of the valid refresh token remaining, a probability of a situation, in which the authorization request is again performed, occurring in the normal processing is low. Normally, in a state where a valid refresh token is present, the client refreshes the authorization token by not performing the authorization request but using the refresh token, and accesses the resource by using the new acquired authorization token. In other words, the situation that, in spite of the valid refresh token remaining, the authorization request is performed seems to be in a situation in which the client side somehow is necessary for obtaining the authorization operation of the user again. In addition, it seems to be in a situation in which the refresh token held by the client cannot be used. For example, a case such that there were large scale updates about the clients and information about the refresh token has once been cleared can be considered. In this case, the client ID is the same but it may be a case in which it is preferred to obtain the authorization operation from the user again. Obviously, the processing for adding the condition not to perform the skip processing of the authorization confirmation is optional processing, and it may be configured so as not to perform this optional processing.

If the authorization confirmation processing in S412 starts, in S701, the authorization server module 301 acquires the client ID, UUID which corresponds to the user ID, and the scope, which are included in the authorization request. Here, a description will be given by assuming that the client ID is "c001@xx.com", the UUID is "10000001", and the scope is "profile".

Next, in S702, the authorization server module 301 searches, by using the combination of the client ID, UUID, and the scope acquired in S701, whether the refresh token having the same combination exists in a valid state in the token table.

In S703, as the result of the processing in S702, if the valid refresh token does not exist, the authorization confirmation module 301 moves to the processing of S704. In addition, if the valid refresh token does exist, it moves to the processing of S708.

Next, in S704, the authorization server module 301 acquires an already permitted (authorized) list, which is a list in which the authorization request has been authorized. In the already permitted list, at least a client ID, UUID, and scope are included. The following is an example of the already permitted table of the authorization server module.

TABLE 6

ALREADY PERMITTED LIST TABLE OF
AUTHORIZATION SERVER MODULE

| | UUID | CLIENT ID | SCORE LIST |
|---|---|---|---|
| ROW 1 | 10000001 | c001@xx.com | profile, publsh |
| ROW 2 | 10000001 | c001@xx.com | profile |

In S705, the authorization server module 301 verifies whether the combination of the data acquired in S701 exists in the table acquired in S704. In the illustrated table, the combination of the client ID "c001@xx.com", UUID "10000001", and scope "profile" is already registered, and therefore as a result of the verification, it is determined to be already permitted. In addition, for example, if the client ID is different, or UUID is different, or further, if only the scope is different, it is determined to be not already permitted.

In S706, if the verification result in S705 is already permitted, the authorization server module 301 moves to S707, and if it is determined that it is not already permitted, then the processing branches to S708.

In S707, the authorization server module 301 sets the result of the authorization confirmation processing to "permission reply" and ends the processing. Note that the processing described in S704 to S707 is the aforementioned skip processing of the authorization confirmation. As described above, in OAuth 2.0, it is optional processing and it is possible to be configured such that an authorization confirmation screen reply is always performed. In addition, in the authorization request described in FIG. 4, it is possible to be configured so as to be able to specify such that the authorization confirmation screen is always replied to.

Figure 7:
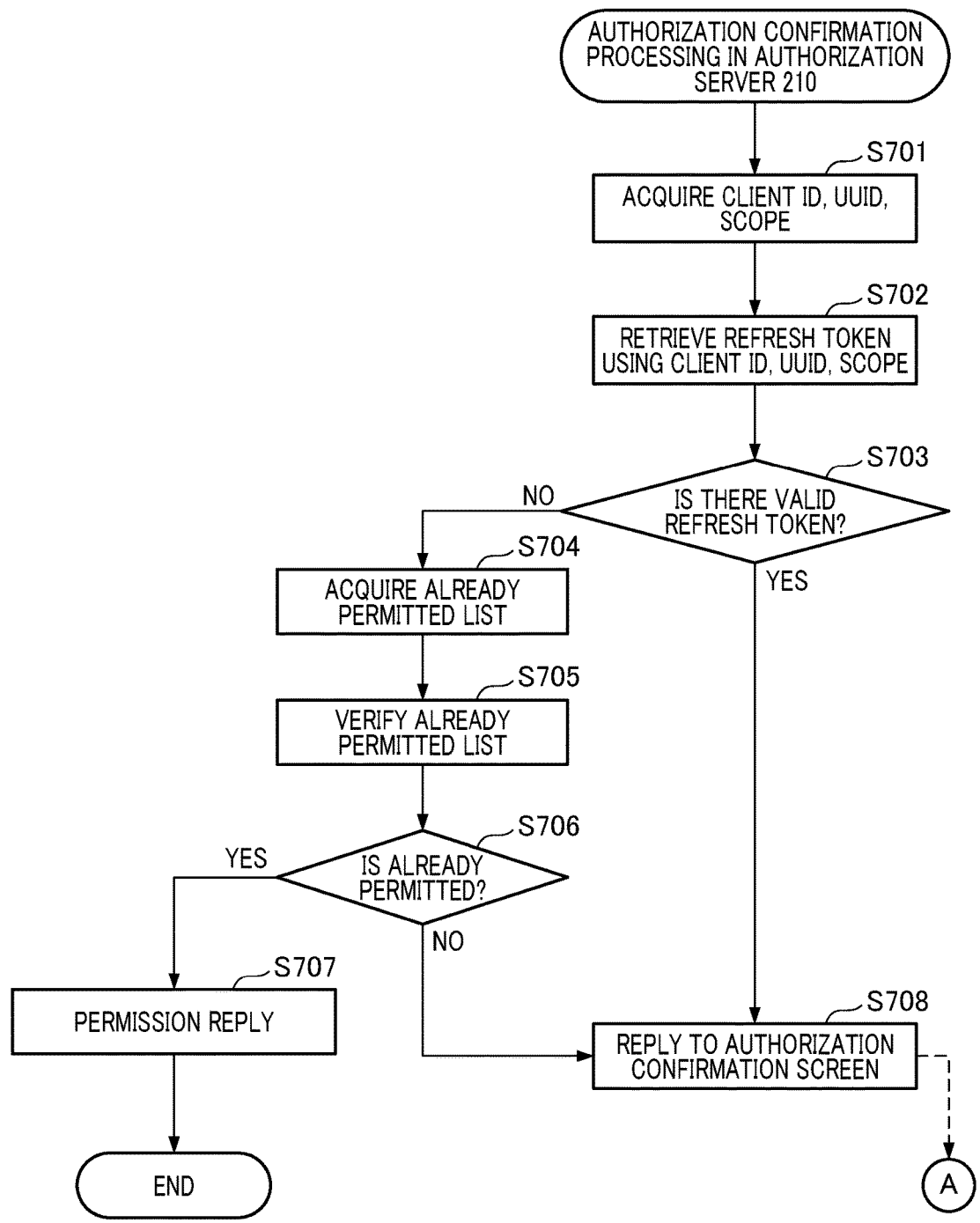
FIG. 7 is a flowchart illustrating an authorization confirmation process.
Figure 8:
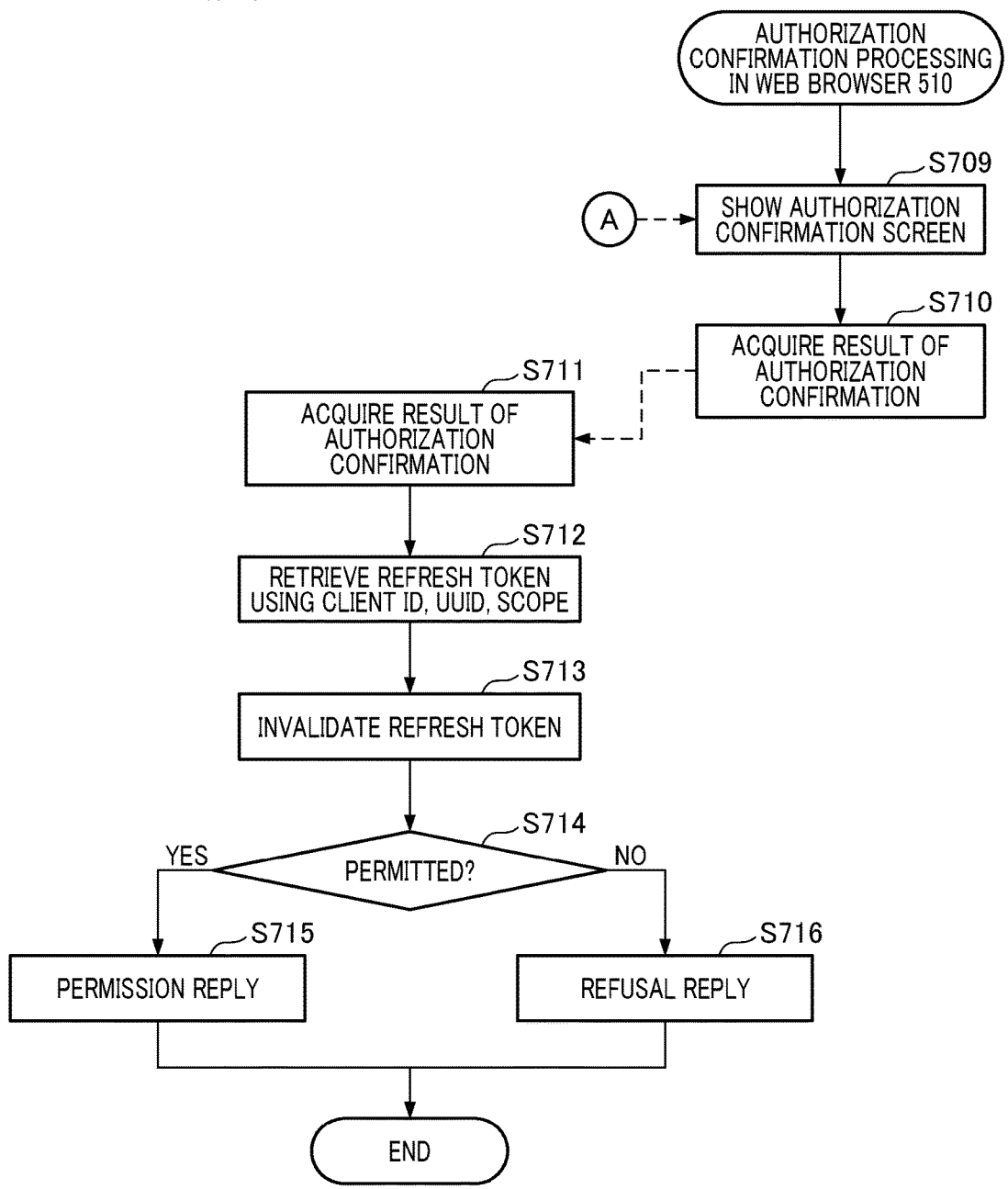
FIG. 8 is a flowchart illustrating an authorization confirmation process.

In addition, in FIG. 7, an example in which after retrieving whether a valid refresh token exists, the already permitted list is verified, but the verification of the already permitted list can be performed before, and if verification has already been permitted, then retrieve whether the valid refresh token exists.

In the authorization server module 301, as a result of the verification of the already permitted list in S705, if data corresponding to the condition does not exist, it is determined that verification is not already permitted in S706, and the process moves to S708.

In S708, the authorization server module 301 replies with the authorization confirmation screen to the web browser 106. FIG. 8 illustrates an example of the replied authorization confirmation screen. An authorization confirmation screen 900 comprises an access source display area 901, which is an area for displaying a client name acquired from the client table by using the client ID included in the authorization request as a key. Further, the authorization confirmation screen 900 comprises a delegation authorization display area 902, which is an area for displaying a description corresponding to the scope acquired from the authorization request. Moreover, the authorization confirmation screen 900 comprises a permit button 903 for the user to execute the authorization operation about the content of the above information, and a refuse button 904 for executing a refusal.

In S709, the web browser 106 shows the acquired authorization confirmation screen 900 to the user.

Then, in S710, if the user presses the permit button 903 or refuse button 904, the web browser 106 acquires the result of the authorization confirmation and notifies the authorization server module 301.

In S711, the authorization server module 301 acquires the result of the authorization confirmation.

Next, in S712 and S713, the same processing as S702 and S703 is performed and a unnecessary fresh token is deleted. The reason why the same processing as S702 and S703 is performed again is that while the authorization confirmation processing is performed in the web browser 106, other processing may be performed in the authorization server module, and it is necessary to retrieve again whether the valid refresh token exists. As a result, for example, as a result of the authorization confirmation processing in the sequence described in FIG. 4, the state of the refresh token of the token ID "rt_000000" is updated as "invalid". In addition, if the processing is executed after S615 in the sequence described in FIG. 6, the refresh tokens, which are assumed to have been acquired by the third party after a refresh, are invalidated together. As described above, this processing enables preventing fraudulent execution of the API by the third party. Note that in the description with reference to the figures, only invalidating the refresh token is described, but the authorization token can be invalidated together with the same condition.

Next, in S714, if the result of the authorization confirmation acquired in S711 is permitted, in S715, the authorization server module 301 ends the processing as the result of the authorization confirmation processing is "permission reply". If the result of the authorization confirmation is refused, in S716, the authorization server module 310 ends the processing as the result of the authorization confirmation processing is "refusal reply".

The above-described description is the authorization confirmation processing, which is the feature of the present embodiment. This authorization confirmation processing enables invalidating the unnecessary refresh token and eliminating the aforementioned case which needs to be handled, in other words, enables eliminating the state in which the third party can fraudulently use the API published by the resource server module 303.

Second Embodiment

In the authorization confirmation processing described with reference to FIG. 7 and FIG. 8, a description was given of processing of how to deal with a case in which a third party leaks the information. However, in OAuth 2.0, a case in which the client itself acquires permission from the user fraudulently and thereby acquires the user's resource fraudulently can be assumed. For example, a method such that an article that attracts an interest of the user is described, and the user is induced to perform the authorization confirmation to read the rest of the article may be considered. In such cases, it is conceivable that by the call for attention from other users, the user notices that an unnecessary authorization operation is performed on the client and handles it. However, the client side also tries to acquire the resource of the user by repeatedly publishing articles or the like in order to obtain the authorization operation from the user by various methods.

Accordingly, in the authorization confirmation processing described below, the call for attention is executed such that the authorization operation from the client that the user has once explicitly refused in the past should not be performed again. Further, if the authorization request is performed again from the client by whom the authorization operation has once executed, processing for not skipping the authorization operation is executed, so that the occurrence of the aforementioned case would be reduced.

Here, in order not to skip the authorization operation, in the processing of the determination of whether the authorization has already been done, confirmation of whether the refresh token issued in the same condition remains in a valid state is performed. This is because, in normal processing, in spite of the valid refresh token remaining, the probability of the occurrence of the situation in which the authorization request is executed again is low. Normally, if the valid refresh token exists, the client does not execute an authorization request, but refreshes the authorization token by using the refresh token and accesses the resource by using the acquired new authorization token.

However, as described above, if the client's purpose is to acquire the resource fraudulently, it is assumed that the client submits a description of an article for prompting the authorization operation to unspecified number of users. Accordingly, it will be a start of the processing from the article and not using the refresh token to the same user. As a result, the configuration in which the authorization request is executed again is assumed.

Figure 9:
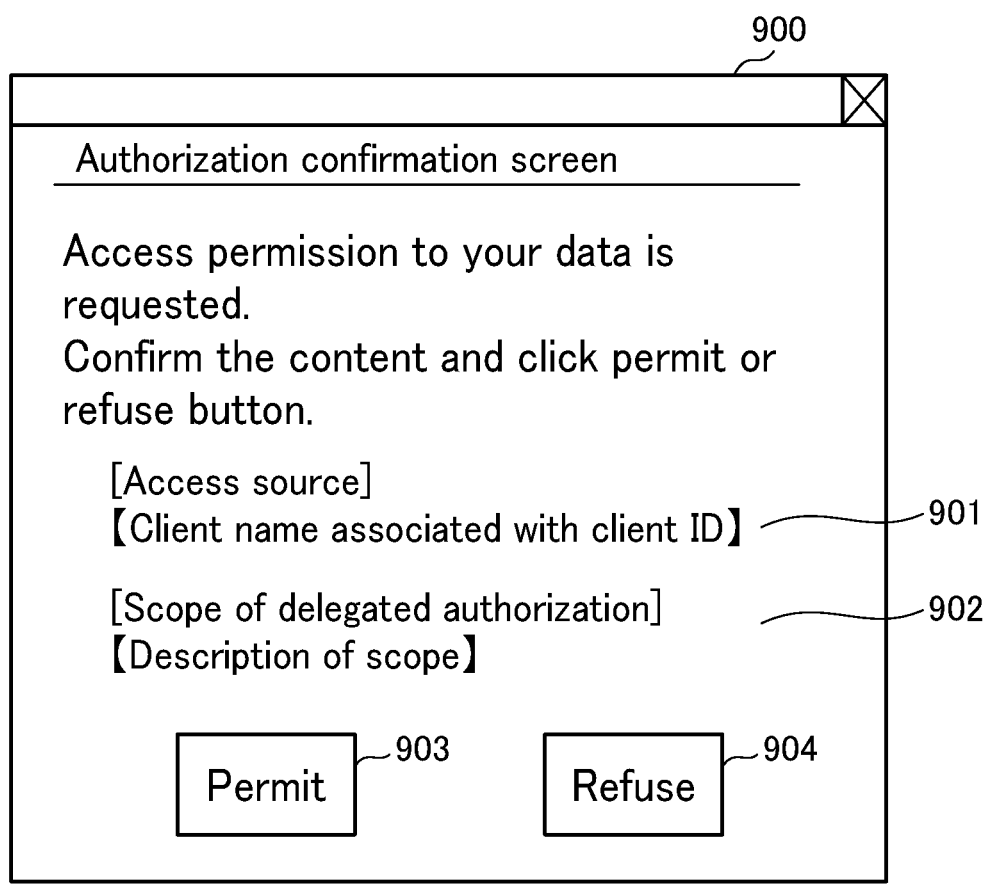
FIG. 9 is an example of an authorization confirmation screen.

A description will be given of the authorization confirmation processing S412 in a case for the purpose of reducing the occurrence of the aforementioned case with reference to FIG. 10 and FIG. 11. Note that same configurations and same processing implemented in FIG. 7 to FIG. 9 will be numbered with same numbers and the description will be omitted.

Figure 10:
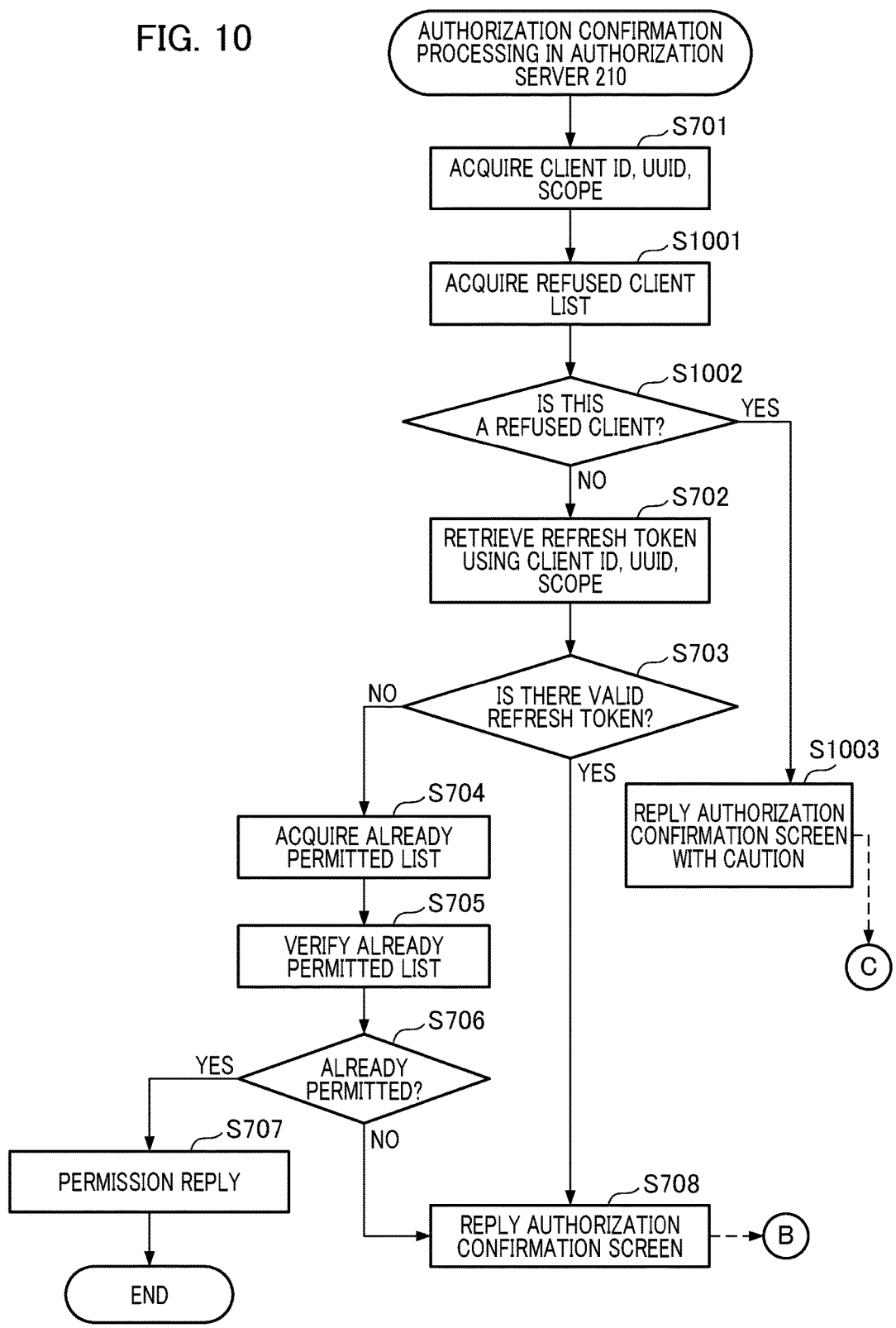
FIG. 10 is a flowchart illustrating an authorization confirmation process according to a second embodiment.
Figure 11:
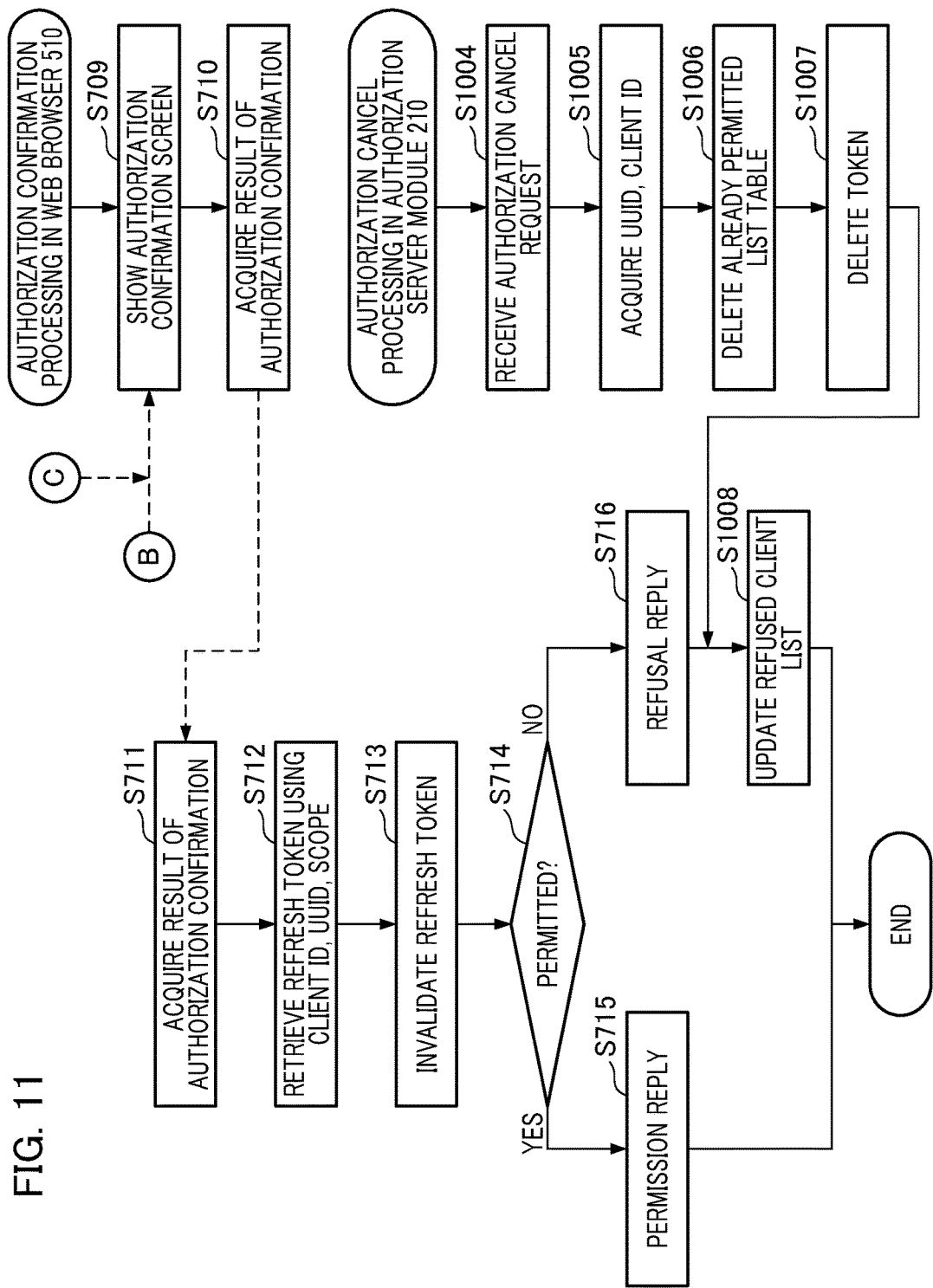
FIG. 11 is a flowchart illustrating an authorization confirmation process according to a second embodiment.

FIG. 10 and FIG. 11 are flowcharts illustrating the authorization confirmation processing S412 by the authorization server module 301 according to the second embodiment.

In S701, as described in FIG. 7, the authorization server module 301 acquires the client ID, user UUID, and scope.

In S1001, the authorization server module 301 acquires a refused client list, which is a list of the clients that have been refused in the past on the authorization confirmation screen or for which the authorization confirmation has been canceled by the following method, in other words, the clients for which the authorization has been canceled. Here, as a method for cancelling authorization, for example, in the authorization server module 301, an authorization cancel screen of the web browser 106 is shows, and by the user's operation, cancelling the authorization may be considered.

The following is a refused client table of the authorization server module.

TABLE 7

REFUSED CLIENT LIST TABLE OF AUTHORIZATION SERVER MODULE

| | UUID | CLIENT ID |
|---|---|---|
| ROW 1 | 10000001 | c002@zz.com |

Here, the table illustrates that the user, which the UUID corresponding to the user ID is "10000001" has performed the refusal operation to a client ID "c002@zz.com".

Figure 12A:
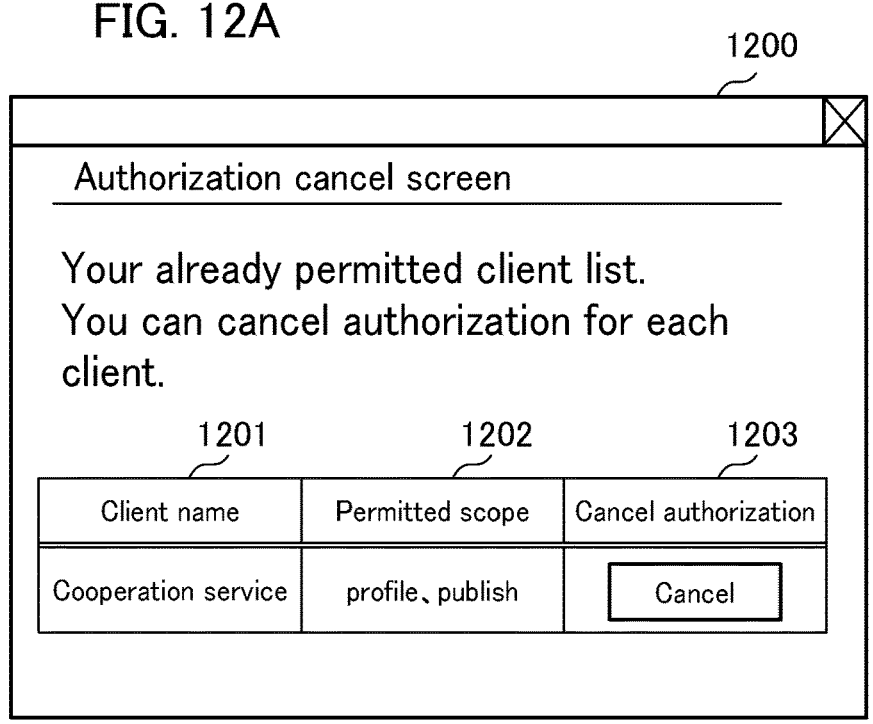
FIGS. 12A and 12B are examples of an authorization cancel and a refusal cancel screen according to a second embodiment.

FIG. 12A illustrates an example of the aforementioned authorization cancel screen. An authorization cancel screen 1200 comprises a client name 1201, a scope 1202, and an authorization cancel button 1203 for executing cancelation, and these are acquired from the client table based on a client ID on the already permitted list table of the authorization server module.

Next, a description will be given of processing for accessing the authorization cancel screen 1200.

The user requests the authorization server module 301 to access the authorization cancel screen via the HTTP server module 302 by using the web browser 106. With respect to the authentication processing below, the description will be the same as S404 to S409 described with reference to FIG. 4 where the term "authorization request" is replaced with "access request to authorization cancel screen", and thereby the description is omitted.

The authorization server module 301 that received the access request of the authorization cancel screen acquires information from the already permitted list table of the authorization server module based on the UUID of the user associated with the received authentication token. Then the authorization server module 301 generates the authorization cancel screen 1200 and responds in the web browser 106.

The web browser 106 shows the acquired authorization cancel screen 1200 to the user. And if the user presses the authorization cancel button 1203, an authorization cancel request is reported to the authorization server module 301. The authorization cancel request reports the aforementioned authentication token associated with the UUID and the client ID, which is the target to be canceled.

The authorization server module 301, which has received the authorization cancel request in S1004, acquires the client ID and the UUID in S1005.

Next, the authorization server module 301 deletes data in the already permitted list table, which matches the combination of the acquired client ID and UUID, in S1006.

Further, the authorization server module 301 may invalidate the state of the data in the token table, which matches the combination of the client ID and UUID, in step S1007.

The authorization server module 301 registers the received client ID and UUID in the refused client list table and ends the processing, in S1008 described below.

Note that although the authorization cancel screen 1200 is illustrated as a separate screen from a cancel screen of the refused client, these two screens may be configured as a same screen.

In S1002, the authorization server module 301 confirms whether the combination of the UUID and client ID acquired in S701 are registered in a refused client list (refusal determination). If registered as a refused client, the process moves to S1003, and if not a refused client, the process move to S702.

In S1003, the authorization server module 301 replies to an authorization confirmation screen with a caution to the web browser 106.

Figure 13:
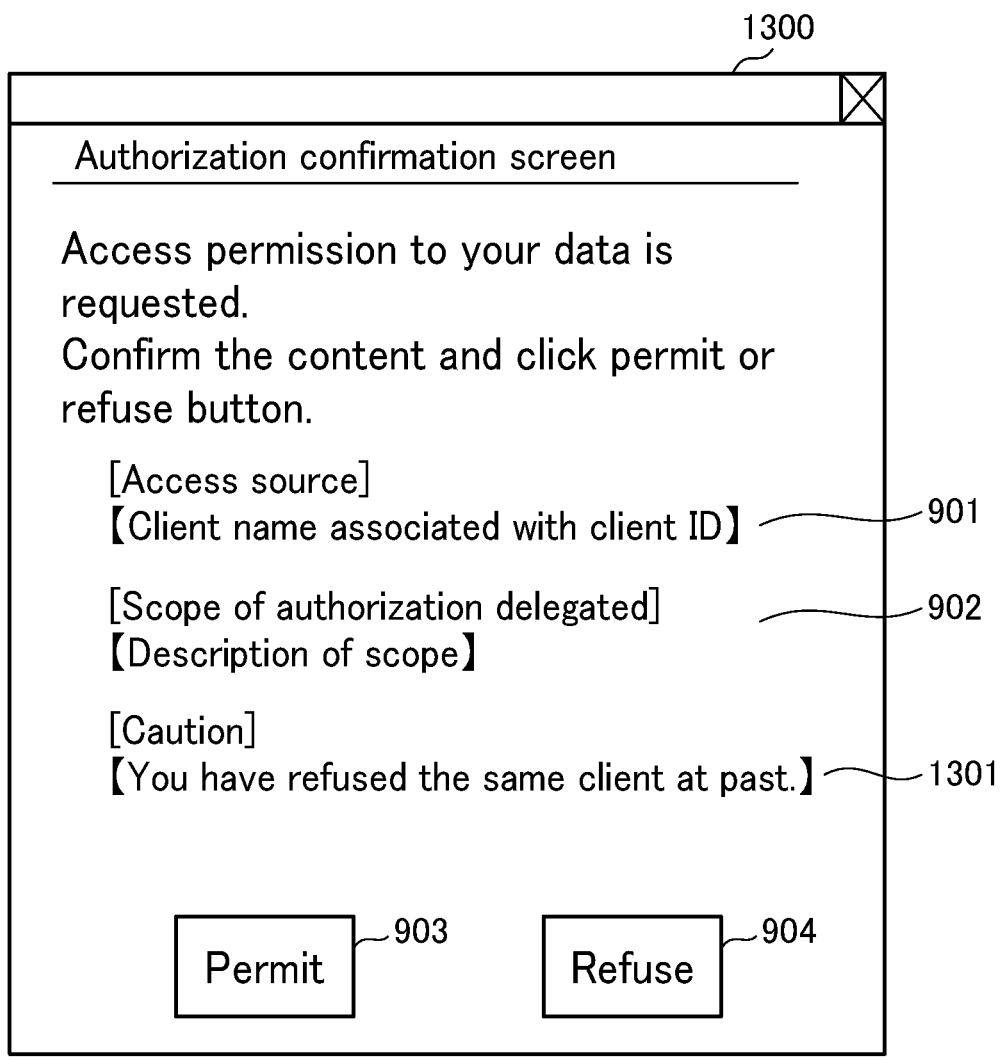
FIG. 13 is an example of an authorization confirmation screen.

FIG. 13 is illustrating an example of the replied authorization confirmation screen with a caution. An authorization confirmation screen with a caution 1300 comprises a refused client display area 1301, which describes that, in the past, the access from the same client has been refused, as an additional element of the components of FIG. 9. Note that the authorization confirmation screen with a caution is an example, and such authorization screens that call for the attention of the user are all together referred to as a "warning authorization screen".

By showing the authorization confirmation screen with a caution 1300, executing of the authorization operation again to the client once the user has refused in the past can be reduced. Note that, it is possible to configure so as not to reply to the authorization confirmation screen with a caution 1300 here, but forcibly moving to the same processing in which the user executed the refusal. In this case, the same processing as the processing after S711 in FIG. 8, in which the case that the refusal operation is performed in S710, will be executed. Note that, in this case, if a client is accidentally refused, hereinafter the authorization operation cannot be performed on that client, and therefore, the authorization server module 301 generates the cancel screen of the refused client and the refusal can be canceled too.

Figure 12B:
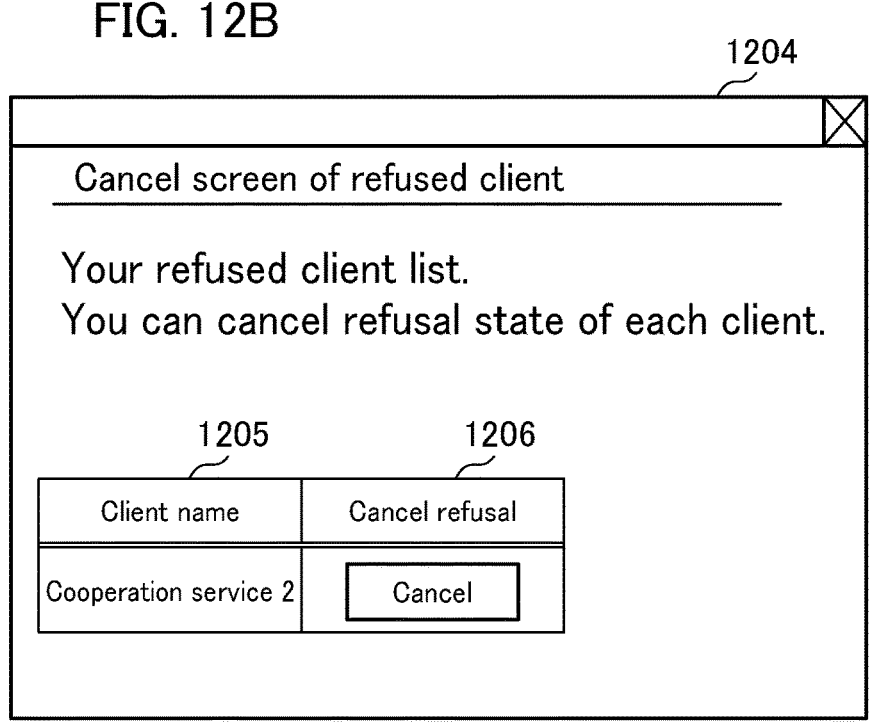

FIG. 12B is illustrating an example of the aforementioned cancel screen of the refused client. A cancel screen of the refused client 1204 comprises a client name 1205 and a refusal cancel button 1206 for executing cancelation, which are acquired from the client table based on a client ID on the refused client list table of the authorization server module. Note that the processing for accessing the cancel screen of the refused client 1204 will be same as the processing for accessing the authorization cancel screen 1200 if the term "access request to authorization cancel screen" is replaced with "access request to cancel screen of the refused client", and thereby the description is omitted.

The authorization server module 301 which has received the access request to the cancel screen of the refused client acquires information from the refused client list table of the authorization server module based on the UUID of the user associated with the received authentication token. Then the authorization server module 301 generates the cancel screen of the refused client 1204 and replies to it with the web browser 106.

The web browser 106 shows the acquired cancel screen of the refused client 1204 to the user. And if the user presses the refusal cancel button 1206, the authorization server module 301 is notified about a refusal cancel request. The refusal cancel request notifies the aforementioned authentication token associated with the UUID and the object client ID for which the refusal has been cancelled.

The authorization server module 301 that has received the refusal cancel request deletes data that matches the combination of the corresponding client ID and the UUID in the refused client list table, and ends the processing.

Note that the cancel screen of the refused client 1204 is illustrated as a separate screen from the authorization cancel screen 1200, but these two screens may be configured as a same screen.

Next, a description will be given of a processing in a case where the user operates the authorization confirmation screen with a caution 1300. Note that the processing in a case where the user has pressed the permit button 903 on the authorization confirmation screen with a caution 1300 is the same as that described in FIG. 8, and thereby the description will be omitted. If the user presses the refuse button 904 on the authorization confirmation screen with a caution 1300, after the process of S716 in FIG. 8, the updating processing of the refused client list is performed in S1008. More specifically, the authorization server module 301 registers the combination of the acquired UUID and client ID in the refused client list table if it is not registered, and ends the processing.

In S1002, if it has been determined that the client is not the refused client, the authorization server module 301 moves to S702. The processing after S702 is the same as that the processing shown in FIG. 7 and FIG. 8 except for the aforementioned additional processing in S1008 in a case that the authorization confirmation result was refusal, and therefore the description is omitted. As a result of the processing in S702, if the valid refresh token exists, the authorization server module 301 does not execute the processing of skipping the authorization confirmation screen, and moves to the processing of replying to authorization confirmation screen described in S708 of FIG. 7 and FIG. 8. The processing hereinafter is the same as the processing shown in FIG. 7 except for the aforementioned additional processing in S1008 in a case that the authorization confirmation result was refusal, and therefore the description is omitted.

As described above, in OAuth 2.0, it is possible to reduce the user executing the authorization operation in a case where the client fraudulently acquires the user's resource by fraudulently acquiring permission from the user.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-147023, filed Jul. 24, 2015, which is hereby incorporated by reference wherein in its entirety.

What is claimed is:

1. An authorization delegation system that comprises a resource server that provides a service and an authorization server that performs authorization delegation for authorizing a client apparatus access to user data that the resource server has based on authorization information,
    wherein the authorization server includes at least a processor and at least a memory coupled to at least the processor and having stored thereon instructions which, when executed by the at least the processor, cause the authorization server to perform operations comprising:
    performing, by an authentication unit, an authentication of a user based on received user authentication information from the client apparatus;
    issuing, by an authorization unit, two sets of information, one of which is the authorization information to inform an allowance of the authorization and the other of which is updating authorization information to update the authorization information automatically, when an authorization request to request the authorization delegation is received from the client apparatus and it is permitted to delegate authority concerning a use of the service of the authenticated user to the client apparatus;
    receiving, by a receiving unit, another authorization request from the client apparatus;
    retrieving, by a retrieving unit, whether or not the updating authorization information has already been issued when the authorization request received by the receiving unit is acquired;
    wherein, when confirmed that the updating authorization information has already been issued for the retrieval by the retrieving unit, the authorization unit invalidates the retrieved updating authorization information, and controls whether to newly issue the authorization information and the updating authorization information according to a new permission of a user.

2. The authorization delegation system according to claim 1, wherein the authorization request at least includes a user ID, a UUID, and a scope.

3. The authorization delegation system according to claim 1, wherein the instructions, when executed by at least the processor, cause the authorization server to perform operations comprising:
    replying, by a screen replying unit, to an authorization confirmation screen about whether or not the authorization delegation is permitted, if the receiving unit received the authorization request;
    acquiring, by a result acquiring unit, a result performed on the authorization confirmation screen,
    wherein the authorization unit invalidates the updating authorization information whatever the result acquired by the result acquiring unit is.

4. The authorization delegation system according to claim 3, wherein the instructions, when executed by at least the processor, cause the authorization server to perform operations comprising: verifying, by a verifying unit, whether the authorization delegation a performed in the past based on the authorization request.

5. The authorization delegation system according to claim 4, wherein, if the verifying unit determines that the authorization delegation was performed in the past, the replying unit does not reply to the authorization confirmation screen.

6. The authorization delegation system according to claim 3, wherein the instructions, when executed by at least the processor, cause the authorization server to perform operations comprising: cancelling, by a cancelling unit, the authorization delegation,
    wherein the receiving unit further receives a cancel request for requesting a cancellation of an authorization delegation,
    wherein, if the cancel request is received, the screen replying unit further replies with a cancelation screen,
    wherein the result acquiring unit further acquires a result performed on the cancelation screen, and
    wherein the canceling unit cancels the authorization delegation based on the cancel request, if the result acquired by the result acquiring unit is a cancellation.

7. The authorization delegation system according to claim 6,
    wherein the cancel request at least includes a client ID and authorization information corresponding to UUID, and
    wherein the cancelling unit cancels the authorization delegation by deleting or invalidating data that matches the client ID and the UUID.

8. The authorization delegation system according to claim 3, wherein the instructions, when executed by at least the processor, cause the authorization server to perform operations comprising: determining, by a refusal determining unit, whether or not a client is a refused client, which is a client for whom the user has refused the authorization request or a client for whom the user has canceled the authorization delegation, based on the authorization request,
    wherein, if the refusal determining unit has determined that the client is the refused client, the screen replying unit replies to the authorization confirmation screen with a caution.

9. An authorization server that performs authorization delegation for authorizing a client apparatus access to user data that the resource server, which provides a service, has based on authorization information,
    wherein the authorization server includes at least a processor and at least a memory coupled to at least the processor and having stored thereon instructions which, when executed by the at least the processor, cause the authorization server to perform operations comprising:

performing, by an authentication unit, an authentication of a user based on received user authentication information from the client apparatus;

issuing, by an authorization unit, two sets of information, one of which is the authorization information to inform an allowance of the authorization and the other of which is updating authorization information to update the authorization information automatically, when an authorization request to request the authorization delegation is received from the client apparatus and it is permitted to delegate authority concerning a use of the service of the authenticated user to the client apparatus;

receiving, by a receiving unit, another authorization request from the client apparatus;

retrieving, by a retrieving unit, whether or not the configured to retrieve updating authorization information has already been issued when the authorization request received by the receiving unit is acquired;

wherein, when confirmed that the updating authorization information has already been issued for the retrieval by the retrieving unit, the authorization unit invalidates an invalidating unit configured to invalidate the retrieved updating authorization information, and controls whether to newly issue the authorization information and the updating authorization information according to a new permission of a user.

10. A control method for an authorization delegation system that includes a resource server which provides a service and an authorization server that performs authorization delegation for authorizing a client apparatus access to user data that the resource server has based on authorization information, the control method comprising:

performing an authentication of a user based on received user authentication information from the client apparatus;

issuing two sets of information, one of which is the authorization information to inform an allowance of the authorization and the other of which is updating authorization information to update the authorization information automatically, when an authorization request to request the authorization delegation is received from the client apparatus and it is permitted to delegate authority concerning a use of the service of the authenticated user to the client apparatus;

receiving another authorization request from the client apparatus;

retrieving whether or not the updating authorization information has already been issued when the authorization request is acquired;

wherein, when confirmed that the updating authorization information has already been issued in the retrieving, in the issuing, invalidates the retrieved updating authorization information, and controls whether to newly issue the authorization information and the updating authorization information according to a new permission of a user.

11. A non-transitory storage medium on which is stored a computer program for making a computer function as respective units of an authorization server wherein the authorization server performs authorization delegation for authorizing a client apparatus access to user data, which a resource server that provides a service has, based on authorization information, wherein the authorization server includes at least a processor and at least a memory coupled to at least the processor and having stored thereon instructions which, when executed by the at least the processor, cause the authorization server to perform operations comprising:

performing, by an authentication unit, an authentication of a user based on received user authentication information from the client apparatus;

issuing, by an authorization unit, two sets of information, one of which is the authorization information to inform an allowance of the authorization and the other of which is updating authorization information to update the authorization information automatically, when an authorization request to request the authorization delegation is received from the client apparatus and it is permitted to delegate authority concerning a use of the service of the authenticated user to the client apparatus;

receiving, by a receiving unit, another authorization request from the client apparatus;

retrieving, by a retrieving unit, whether or not the updating authorization information has already been issued when the authorization request received by the receiving unit is acquired;

wherein, when confirmed that the updating authorization information has already been issued for the retrieval by the retrieving unit, the authorization unit invalidates the retrieved updating authorization information, and controls whether to newly issue the authorization information and the updating authorization information according to a new permission of a user.

* * * * *